(12) United States Patent
Uchiyama et al.

(10) Patent No.: US 6,373,421 B2
(45) Date of Patent: *Apr. 16, 2002

(54) VOICE RECORDING/REPRODUCING DEVICE BY USING ADAPTIVE DIFFERENTIAL PULSE CODE MODULATION METHOD

(75) Inventors: Itsuo Uchiyama; Katsuya Maruyama, both of Miyazaki (JP)

(73) Assignee: Oki Electric Industry Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/614,585

(22) Filed: Jul. 12, 2000

(30) Foreign Application Priority Data

Dec. 14, 1999 (JP) ............................................. 11-354012

(51) Int. Cl.[7] ................................................ H03M 1/12
(52) U.S. Cl. ...................................................... 341/155
(58) Field of Search ........................... 341/155, 50, 55, 341/60, 76, 110

(56) References Cited

U.S. PATENT DOCUMENTS 6,055,275 A * 4/2000 Pinier ........................... 341/76
6,157,324 A * 12/2000 Iwata ........................... 341/55

* cited by examiner

Primary Examiner—Brian Young
(74) Attorney, Agent, or Firm—Venable; Robert J. Frank

(57) ABSTRACT

A voice recording/reproducing device implemented by using an ADPCM (Adaptive Differential Pulse Code Modulation) method is provided which is capable of reproducing faithfully an original voice even -at a time of performing a fast-forward reproduction by removing or culling a specified voice block from a continued series of voice blocks.

The voice recording/reproducing device is so configured that an ADPCM analyzer is operated to quantize digital voice data converted by an ADC (Analog-Digital Converter), to encode it and to split to voice blocks and then to add a parameter used to decide a width for quantizing and previously reproduced value to each voice block as an intermediate data, and that an ADPCM synthesizer is operated to decode, at the time of the fast-forward reproduction, a head value of encoded data contained in the voice block to be reproduced by using the additional data. The digital voice data is then converted by the DAC to analog voice signals and original voices are faithfully reproduced.

17 Claims, 5 Drawing Sheets

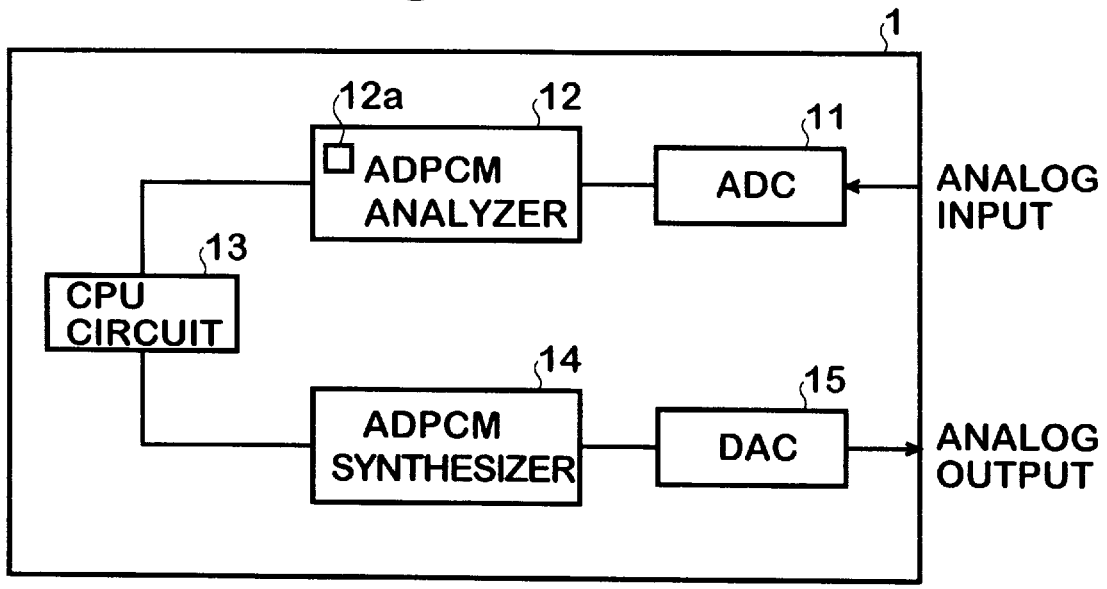
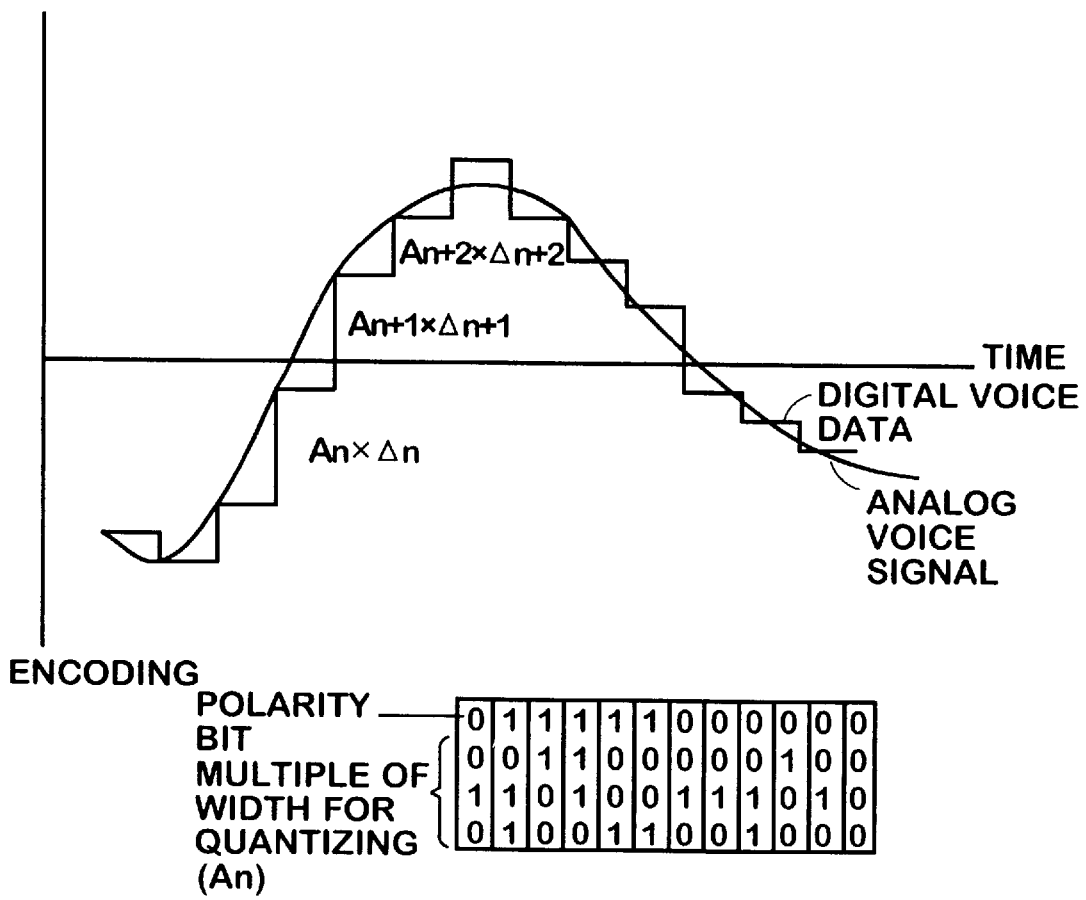

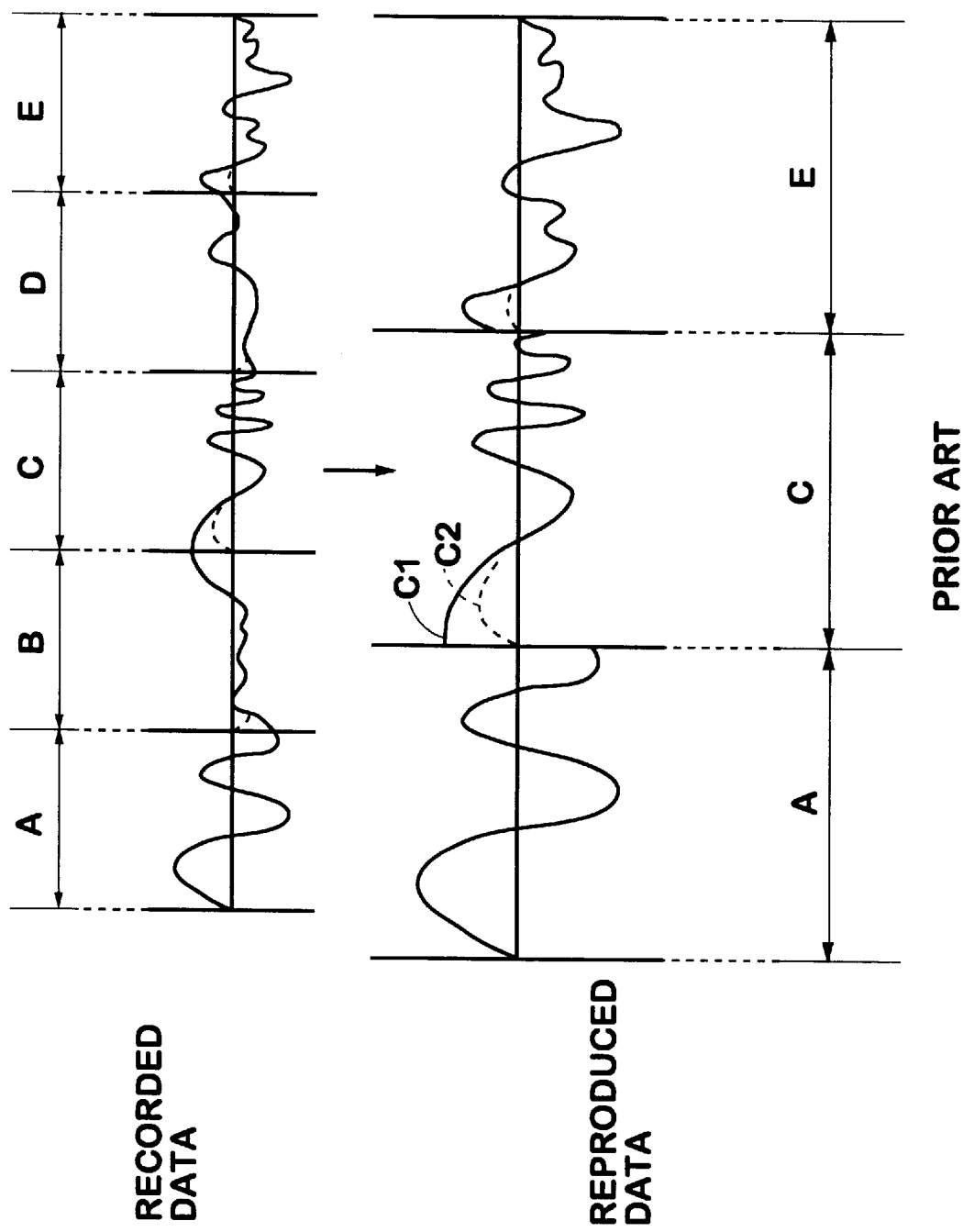

VOICE RECORDING/REPRODUCING DEVICE BY USING ADAPTIVE DIFFERENTIAL PULSE CODE MODULATION METHOD

BACKGROUND OF THE INVENTION

1. Field of the Invention

The present invention relates to a voice recording/reproducing device implemented by using an adaptive differential pulse code modulation method.

2. Description of the Related Art

The adaptive differential pulse code modulation (hereafter referred to as an "ADPCM") is widely used in digital modulation of voices. In the ADPCM method, sampled analog voice data is first converted to digital voice data, then a difference in the sampled data value between a digital voice data and a subsequent or neighboring digital voice data is quantized in accordance with the step for quantizing, i.e., a width for quantizing which is adaptively changed depending on an amplitude of a waveform of the voice signal to be encoded and 3 to 4 bits are used to express one quantized difference for encoding of the voice signal, thereby improving the followability to its original analog waveform.

FIG. 2 is a diagram explaining the ADPCM method in which 4 bits are used for quantizing and encoding of voice signals. An encoded digital voice data obtained by the ADPCM is formed by a multiple of polarity bits and quantizing width $\Delta$. The quantizing width $\Delta$ is decided by the correlation between the present sampled value and the past sampled value of the voice signals. In FIG. 2, the data provided by high order one bit represents a polarity (i.e., an increase or decrease of signals) and the data provided by low order three bits represents the multiple of the quantizing width $\Delta$. The data obtained by the ADPCM is stored in memory.

The digital voice data is reproduced by decoding the data obtained by the ADPCM. The digital voice data being a digital amplitude vale is calculated by the following formula (1):

$$A_{n+1} = A_n \pm (D \times P) \quad (1)$$

where, "$A_{n+1}$" represents the digital amplitude value to be reproduced this time, "$A_n$" represents a digital amplitude value reproduced at a previous time, "D" represents the multiple expressed by the low order bits of encoded data and "P" represents a parameter used to decide the quantizing width $\Delta$. The value (D×P) shown as a product in the formula (1) represents the difference in the sampled data value between a digital voice data and a subsequent or neighboring digital voice data.

The digital voice data is converted to its analog voice data and is then outputted.

Since the ADPCM method has an advantage in that it can provide a good quality and it enables easy creation of voice data considering simple configurations required for implementing the ADPCM, it is used, for example, in IC recorders, telephones or the like. Moreover, the large reduction of the number of bits required for quantizing is made possible.

In the voice recording/reproducing device, for fast-forward reproduction, encoded data is split into voice blocks each having a predetermined size and stored at a time of recording. Then, at the time of the fast-forward reproduction, a part of voice blocks to be reproduced is removed or "culled" from the split voice blocks and encoded data of the voice block is decoded. When any part of the voice block is removed or culled from continued voice blocks for the fast-forward reproduction, the encoded data becomes discontinuous among voice blocks to be reproduced.

FIG. 3 is a diagram explaining operations of a voice recording/reproducing device implemented by the conventional ADPCM method. As shown in FIG. 3, if the voice blocks B and D are partially removed or culled from the whole voice blocks A, B, C, D and E in order to carry out the fast-forward reproduction, the discontinuity occurs between the blocks A and C and between C and E as a result.

In the voice recording/reproducing device implemented by the conventional ADPCM method, the digital amplitude value "$A_{n+1}$" being a presently reproduced value is calculated by, for convenience's sake, setting both a digital amplitude value "An" being a just previously reproduced value and the parameter "P" to O. Because of this, at the time of the fast-forward reproduction, though, in the voice block B, its original voice signal is faithfully reproduced, in the voice block C, its original voice signal C1 is not reproduced faithfully and a reproduced voice signal C2 appears instead, i.e., at a head portion of the voice block C, the original voice signal cannot be faithfully reproduced, thus causing an inconvenience in that the reproduced voice cannot be clearly heard. The same thing occurs in the voice block E.

SUMMARY OF THE INVENTION

In view of the above, it is an object of the present invention to provide a voice recording/reproducing device capable of reproducing faithfully an original voice even at a time of performing fast-forward reproduction.

According to one aspect of the present invention, there is provided a voice recording/reproducing device implemented by using an adaptive differential pulse code modulation method including:

an analog-digital converter to sample analog voice signals and to convert them to digital voice data;

recording means for quantizing a difference in the sampled data value between a digital voice data and a subsequent and neighboring digital voice data obtained by the analog-digital converter in accordance with the width for quantizing corresponding to the difference, for obtaining encoded data by encoding the quantized difference and then for splitting the encoded voice data into voice blocks each having a predetermined size;

reproducing means for reproducing digital voice data, at a time of a fast-forward reproduction, by sequentially decoding specified data composed of the encoded data contained in the voice block to be reproduced and obtained by removing and culling a part of voice blocks from a series of the split voice blocks;

a digital-analog converter to convert reproduced digital voice data to analog voice signals, and whereby the recording means is operated to add just previously sampled data and a parameter used to decide the width for quantizing to a head of the encoded data of each voice block and the reproducing means is operated, at the time of the fast-forward reproduction, to decode the head coded data of the voice block to be reproduced based on the additional data.

In the foregoing, a preferable mode is one wherein the data constituting the difference contains data of a multiple of the width for quantizing and of polarity causing an increase or decrease of the difference.

Also, a preferable mode is one wherein the encoded data contains data of the multiple of the width for quantizing and wherein the reproducing means is operated to decode the head digital voice data of each voice block by using data of the multiple of the width for quantizing contained in the encoded data, just previously sampled data and the parameter used to decide the width for quantizing.

Also, a preferable mode is one wherein the recording means is provided with an ADPCM (Adaptive Differential Pulse Code Modulation) analyzer.

Also, a preferable mode is one wherein the reproducing means is provided with an ADPCM synthesizer.

Also, a preferable mode is one wherein a format of the encoded data is composed of a voice start address region, a voice end address region and an ADPCM data region to its head of which the additional data are added.

Furthermore, a preferable mode is one wherein the format of the encoded data further includes a sampling frequency region.

BRIEF DESCRIPTION OF THE DRAWINGS

The above and other objects, advantages and features of the present invention will be more apparent from the following description taken in conjunction with the accompanying drawings in which:

FIG. 1 is a schematic block diagram showing configurations of a voice recording/reproducing device implemented by an adaptive differential pulse code modulation (ADPCM) method according to one embodiment of the present invention;

FIG. 2 is a diagram explaining the ADPCM in which 4 bits are used for quantizing and encoding of voice signals;

FIG. 3 is a diagram explaining operations of a voice recording/reproducing device implemented by a conventional ADPCM method.

DETAILED DESCRIPTION OF THE PREFERRED EMBODIMENTS

Figure 4:
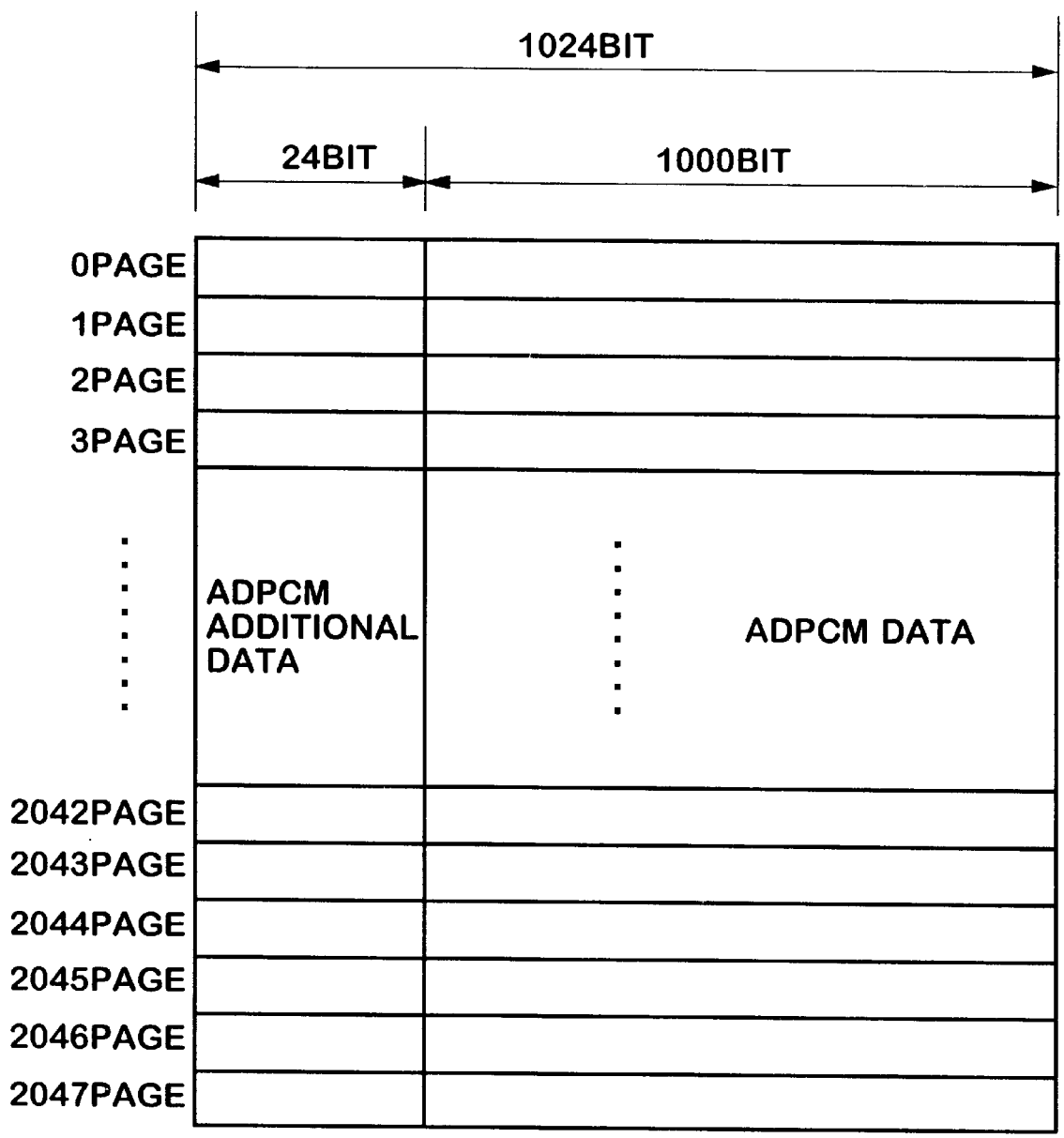
FIG. 4 is a diagram explaining data configurations according to the embodiment of the present invention.

Best modes of carrying out the present invention will be described in further detail using various embodiments with reference to the accompanying drawings.

Embodiment

A voice recording/reproducing. device of this embodiment is one implemented by using an ADPCM, (Adaptive Differential Pulse Code Modulation) method, in which, in order to faithfully reproduce an original voice even at a time of fast-forward reproduction, a parameter used to decide a width for quantizing and a split digital amplitude value obtained immediately before the ADPCM are added to a split ADPCM data.

FIG. 1 is a schematic block diagram showing configurations of the voice recording/reproducing device implemented by the ADPCM method according to one embodiment of the present invention. The voice recording/reproducing device of this embodiment is chiefly composed of an analog-digital converter 11 (hereafter simply called an "ADC"), an ADPCM analyzer 12, a CPU circuit 13, an ADPCM synthesizer 14 and a digital-analog converter (hereafter simply called a "DAC") 15.

The ADC 11 is an analog-digital converting means adapted to sample an analog voice signal and to convert the analog voice signal to a digital voice signal. The ADPCM analyzer 12 is a recording means for analyzing the digital voice data converted by the ADC 11, quantizing a difference between neighboring digital data, i.e., between the digital data subsequent to each other, encoding the quantized difference, splitting the encoded voice data to voice blocks each having a predetermined size and adding additional data to be described later to the ADPCM data obtained by encoding the voice block. Moreover, a memory 12a used to store additional data or the like is embedded in the ADPCM analyzer 12. The CPU circuit 13 is operated to control an overall device. The ADPCM synthesizer 14 is a reproducing means for reproducing digital voice data by decoding the ADPCM data. The DAC 15 is a digital to analog converting means for converting the reproduced digital voice data to the analog voice signal and for outputting it.

Operations of the voice recording/reproducing device of this embodiment will be described below.

The analog voice signal is sampled by the ADC 11 at a time of recording and then converted to digital recording data. The converted digital voice data is inputted into the ADPCM analyzer 12. In the ADPCM analyzer 12, every time the digital voice data is sampled, the quantizing width $\Delta$ used as a basic value is adaptively changed depending upon the difference between the neighboring digital voice data, and by using this quantizing width $\Delta$ and its multiple, the difference is quantized. That is, the information containing the quantized difference represented by the product of the quantizing width $\Delta$ and its multiple is encoded to 3 to 4 bit data. This allows the ADPCM data showing the polarity bit and the multiple of the quantizing width to be obtained as in the conventional method. The ADPCM data is split into voice blocks each having a predetermined size in order to perform the fast-forward reproduction. Moreover, the parameter used to decide both the amplitude value of the digital voice data positioned at the end of the previous voice block and the quantizing width $\Delta$ is added, as an additional data, to the ADPCM data positioned at the head of each of the voice blocks, and is then stored, together with the ADPCM data including the polarity bit and the multiple data of the quantizing width, into the memory 12a of the ADPCM analyzer 12.

FIG. 4 is a diagram explaining data configurations according to the embodiment of the present invention. As shown in FIG. 4, the data size of each of the voice blocks is set to 1024 bits and the data is split into 0 to 2047 pages. The ADPCM data is composed of 1000 bits and the ADPCM additional data is composed of 24 bits. The amount of the memory used is increased by the addition of the additional data accordingly. The data size is not limited to the example shown in FIG. 4. The size of the ADPCM data and additional data can be adaptively changed so as to prevent the total amount of the memory from becoming too large.

At the time of the voice reproduction, the ADPCM data and the additional data are read out from this memory and the voice reproduction is carried out by the ADPCM synthesizer 14.

Figure 5:
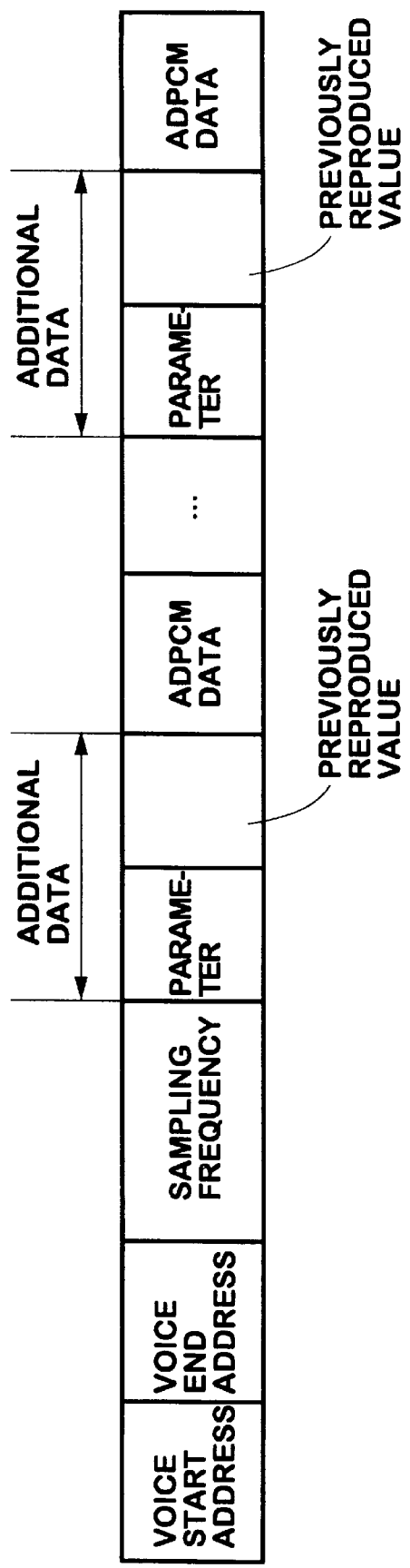
FIG. 5 a diagram explaining a format of data for voice reproduction according to the embodiment of the present invention.

FIG. 5 a diagram explaining a format of data for voice reproduction according to the embodiment of the present invention. As shown in FIG. 5, this data is composed of a voice start address, a voice end address, a sampling frequency and an ADPCM data, and further additional data are added to a head of the ADPCM data of each voice block. The reproduction of voices is carried out based on the data of this form. As depicted in FIG. 6(A), an analog voice signal to be reproduced is split into voice blocks A to E.

At the time of ordinary reproduction, the ADPCM data of each of the voice blocks A to E is sequentially decoded and the digital voice data is reproduced. At this point, the additional data is not used. The reproduced digital voice data is converted by the DAC 15 to an analog voice signal and is outputted.

Figure 6:
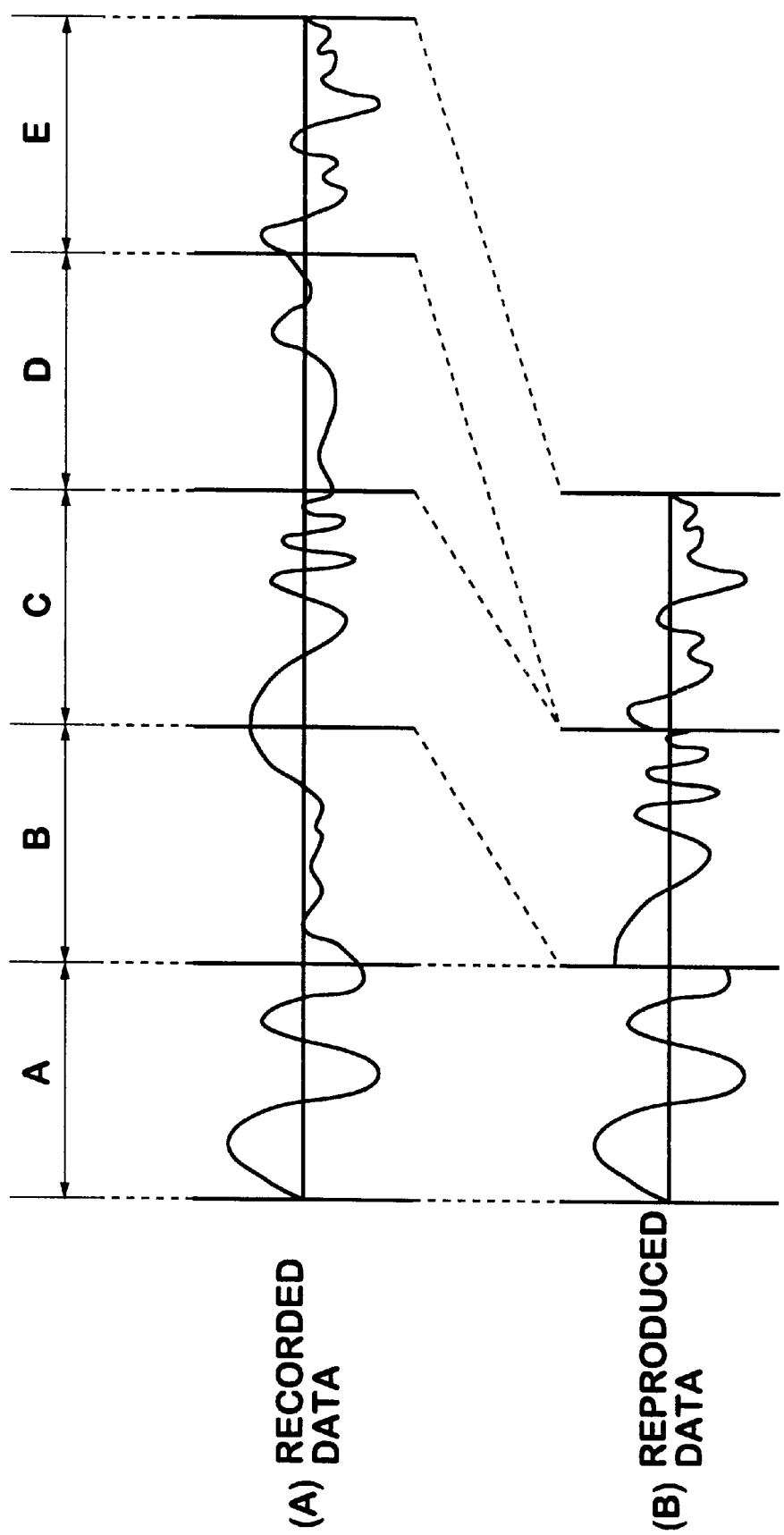
FIG. 6 is a diagram explaining operations of the voice reproduction according to the embodiment of the present invention.

As shown in FIG. 6 (B), when the voice blocks B and D are removed or culled from the recorded voice blocks for the fast-forward reproduction, discontinuity occurs between the voice blocks A and C and between the voice blocks C and E.

In this case, if four bits are used for the ADPCM method, a head value $A_{n+1}$ of the voice blocks C and E can be calculated by the following formula (2):

$$A_{n+1} = A_n' \pm (D \times P) \quad (2)$$

where, "$A_n$" represents a reproduced amplitude value of previously sampled data contained in the additional data, "D" represents low order three bits (a multiple of a quantizing width $\Delta$ of encoded data and "P" represents a parameter used to decide the quantizing width $\Delta$ contained in the additional data.

Then, next reproduced value $A_{n+2}$ is calculated based on the head value $A_{n+1}$ by the following formula (3):

$$A_{n+2} = A_{n+1} \pm (D \times P) \quad (3)$$

where, "D" represents the multiple data for the quantizing width $\Delta$ shown by low order three bits of coded data and "P" represents a parameter used to decide the quantizing width $\Delta$. Based on the reproduced value calculated as above, the ADPCM data of the voice blocks C and E to be reproduced is sequentially decoded.

In the same manner as in the ordinary reproduction, the reproduced digital voice data is converted by the DAC 15 to analog voice signals and outputted for the fast-forward reproduction. At this point, as shown in FIG. 6(B), even if the voice blocks B and D are removed or culled, the head values of the voice blocks C and E are not affected by the removal or culling, thus allowing original voices to be faithfully reproduced.

As described above, according to the embodiment of the present invention, since both the parameter used to decide the width for quantizing and the previously reproduced value are added to the ADPCM data and, at the time of the fast-forward reproduction, by using these additional data, the head value of the voice block obtained after the removal or culling of a part of the voice blocks is calculated, the same data as obtained when the continuous voice signals are reproduced can be obtained and the original voice can be more faithfully reproduced compared with the case of the conventional method.

It is apparent that the present invention is not limited to the above embodiments but may be changed and modified without departing from the scope and spirit of the invention.

What is claimed is:

1. A voice recording/reproducing device implemented by using an adaptive differential pulse code modulation method comprising:

an analog-digital converter to sample analog voice signals and to convert them to digital voice data;

recording means for quantizing a difference in the sampled data value between a digital voice data and a subsequent and neighboring digital voice data obtained by said analog-digital converter in accordance with a width for quantizing corresponding to the difference, for obtaining encoded data by encoding the quantized difference and then for splitting the encoded voice data into voice blocks each having a predetermined size;

reproducing means for reproducing digital voice data, at a time of a fast-forward reproduction, by sequentially decoding specified data composed of the encoded data contained in the voice block to be reproduced and obtained by removing and culling a part of voice blocks from a series of the split voice blocks; and a digital-analog converter to convert reproduced digital voice data to analog voice signals, whereby said recording means is operated to add just previously sampled data and a parameter used to decide said width for quantizing to a head of said encoded data of each voice block and said reproducing means is operated, at the time of the fast-forward reproduction, to decode said head of said encoded data of the voice block to be reproduced based on said additional data.

2. The voice recording/reproducing device according to claim 1, wherein said data constituting said difference contains data of a multiple of said width for quantizing and of polarity causing an increase or decrease of said difference.

3. The voice recording/reproducing device according to claim 1, wherein said encoded data contains data of the multiple of said width for quantizing and wherein said reproducing means is operated to decode said head digital voice data of each voice block by using data of the multiple of said width for quantizing contained in said encoded data, just previously sampled data and said parameter used to decide said width for quantizing.

4. The voice recording/reproducing device according to claim 1, wherein said recording means is provided with an ADPCM (Adaptive Differential Pulse Code Modulation) analyzer.

5. The voice recording/reproducing device according to claim 1, wherein said reproducing means is provided with an ADPCM synthesizer.

6. The voice recording/reproducing device according to claim 1, wherein a format of said encoded data is composed of a voice start address region, a voice end address region and an ADPCM data region, said ADPCM data region having a head portion to which said additional data are added.

7. The voice recording/reproducing device according to claim 1, wherein said format of said encoded data further includes a sampling frequency region.

8. A sound recording/reproducing device implemented to record/reproduce a sound by using an adaptive differential pulse code modulation method, comprising:

an analog-digital converter sampling analog sound signals and converting them to digital sound data at a sequence of sample times;

a recording circuit quantizing a difference between the digital sound data at different sample times based on a width for quantizing and obtaining a sequence of encoded data by encoding the quantized difference, the width for quantizing being set based on the difference;

a reproducing circuit decoding the sequence of encoded data in order to reproduce the digital sound data; and a digital-analog converter converting the reproduced digital sound data to analog sound signals, wherein the decoding circuit uses a plurality of data additional to the encoded data to decode some but not all of the sequence of encoded data during fast-forward reproduction, the additional data being calculated by the recording circuit based at least in part on a parameter related to said width for quantizing.

9. The sound recording/reproducing device according to claim 8, wherein said reproducing circuit decodes substantially all of the encoded data corresponding to the digital sound data to be reproduced during normal reproduction.

10. The sound recording/reproducing device according to claim 8, wherein the recording circuit comprises a memory which stores the sequence of encoded data and the plurality of additional data, each of which corresponds to one of the blocks of the encoded data and includes the parameter.

11. The sound recording/reproducing device according to claim 10, wherein each of said plurality of said additional data further includes a previously reproduced value.

12. The sound recording/reproducing device according to claim 8, wherein each of said plurality of additional data is provided at a head portion of a block of data that also includes a plurality of sequentially encoded data.

13. The sound recording/reproducing device according to claim 8, wherein said recording circuit comprises an ADPCM (Adaptive Differential Pulse Code Modulation) analyzer.

14. The sound recording/reproducing device according to claim 8, wherein said reproducing circuit comprises an ADPCM analyzer.

15. The sound recording/reproducing device according to claim 8, wherein the sound comprises voice utterances.

16. An audio reproducing device for generating sound signals from recorded information that includes a sequence of ADPCM (Adaptive Differential Pulse Code Modulated) data arranged in a sequence of blocks, comprising:

means for synthesizing digitized sound signals in a normal playback mode from the ADPCM data in one block after another, and for synthesizing digitized sound signals in a fast-forward mode from the ADPCM data and additional data in blocks that are isolated from one another by blocks which are culled from the sequence of blocks, the additional data including information about audio amplitude at the end of a previous block and a quantizing width; and means for converting the digitized sound signals to analog sound signals.

17. An audio reproducing device according to claim 8, wherein every other block is culled in the fast-forward mode.

* * * * *